US006853524B2

(12) United States Patent
Juds et al.

(10) Patent No.: US 6,853,524 B2
(45) Date of Patent: Feb. 8, 2005

(54) VACUUM ARC INTERRUPTER HAVING A TAPERED CONDUCTING BULLET ASSEMBLY

(75) Inventors: Mark Allan Juds, New Berlin, WI (US); Edward Louis Wellner, Colgate, WI (US); Francis Christopher Edrozo, Milwaukee, WI (US); Mary Jo Johnson Vander Heiden, Hubertus, WI (US); Peter John Theisen, West Bend, WI (US); Francois Jean Machand, Pittsburgh, PA (US); Erik Dannel Taylor, Ithaca, NY (US)

(73) Assignee: Eaton Corporation, Cleveland, OH (US)

( * ) Notice: Subject to any disclaimer, the term of this patent is extended or adjusted under 35 U.S.C. 154(b) by 195 days.

(21) Appl. No.: 10/172,080

(22) Filed: Jun. 14, 2002

(65) Prior Publication Data

US 2003/0231445 A1 Dec. 18, 2003

(51) Int. Cl.[7] .................................................. H02H 9/00

(52) U.S. Cl. ............................... 361/56; 361/2; 218/57; 218/67

(58) Field of Search ............................... 361/2, 56, 111, 361/115, 42, 43; 200/61, 300; 218/57, 67, 154

(56) References Cited

U.S. PATENT DOCUMENTS

| | | | | |
|---|---|---|---|---|
| 4,489,226 A | * | 12/1984 | Holmgren et al. | 218/57 |
| 5,510,946 A | | 4/1996 | Franklin | |
| 5,903,427 A | | 5/1999 | Roby | |
| 5,933,308 A | | 8/1999 | Garzon | |
| 5,940,547 A | | 8/1999 | Schumacher et al. | |
| 6,140,715 A | | 10/2000 | Bernhoff et al. | |
| 6,141,192 A | | 10/2000 | Garzon | |
| 6,229,680 B1 | | 5/2001 | Shea | |
| 6,239,514 B1 | | 5/2001 | Isberg et al. | |
| 6,633,009 B1 | * | 10/2003 | Shea | 200/61.08 |
| 6,657,150 B1 | * | 12/2003 | Shea et al. | 218/154 |

OTHER PUBLICATIONS

Klockner–Moeller Ltd., "ARCON, Arc Fault Detection and Quenching System", 6 pgs., no date.

UTU, "UTU Arc Protection Systems—a possibility to be protected", 4 pgs., Ulvila, Finland, no date.

Garzon, R., "Arc Terminator An Alternative to Arc–Proofing", pp. 1–5, Square "D" Company, Smyrna, TN, no date.

Square D Schneider Electric, "Arc–Terminator—Medium voltage arc–detection and arc–termination device", Power 2000, 9 pgs., no date.

Abb Power Distribution, "ArcEliminator Rapid Elimination of Internal Arcing", 4 pgs., Arboga, Sweden, no date.

SIEMENS, "Pressure Switch System 8AX10 For Medium Voltage Switchgear", 1 pg., no date.

Berger, F. et al., "KurzschilieBer mit Gasgeneratorantrieb fur Storlichtbogenschutz", 4 pgs., Mar. 1999, Federal Republic of Germany, no date.

RISI, "EBW Cable Cutter", 1 pg., San Ramon, CA, no date.

RISI, "Technical Discussion on Explosives", 13 pgs., no date.

* cited by examiner

*Primary Examiner*—Gregory J. Toatley, Jr.
*Assistant Examiner*—Boris Benenson
(74) *Attorney, Agent, or Firm*—Martin J. Moran

(57) ABSTRACT

A vacuum arc interrupter that includes a vacuum chamber assembly having a first conductor and a pressure chamber assembly having a second metal conductor, with an opening, and a bullet assembly. The first conductor is coupled to a power line and the second conductor is coupled to a ground. The bullet assembly has a metal lance structured to engage the opening. The lance is shaped to create an arc when engaging the opening so that the second conductor and the lance are welded together.

17 Claims, 5 Drawing Sheets

VACUUM ARC INTERRUPTER HAVING A TAPERED CONDUCTING BULLET ASSEMBLY

CROSS-REFERENCE TO RELATED APPLICATIONS

This application is related to commonly assigned, concurrently filed:

U.S. patent application Ser. No. 10/172,208, filed Jun. 14, 2002, entitled "Shorting Switch And System To Eliminate Arcing Faults In Power Distribution Equipment";

U.S. patent application Ser. No. 10/172,651 , filed Jun. 14, 2002, U.S. Pat. No. 6,657,150 issued on Dec. 2, 2003 entitled "Shorting Switch And System To Eliminate Arcing Faults In Power Distribution Equipment";

U.S. patent application Ser. No. 10/171,826, filed Jun. 14, 2002, U.S. Pat. No. 6,633,009 issued on Oct. 14, 2003 entitled "Shorting Switch And System To Eliminate Arcing Faults In Low Voltage Power Distribution Equipment";

U.S. patent application Ser. No. 10/172,238, filed Jun. 14, 2002, entitled "Shorting Switch And System To Eliminate Arcing Faults In Power Distribution Equipment";

U.S. patent application Ser. No. 10/172,622, filed Jun. 14, 2002, entitled "Bullet Assembly For A Vacuum Arc Interrupter";

U.S. patent application Ser. No. 10/172,209, filed Jun. 14, 2002, entitled "Vacuum Arc Interrupter Actuated By A Gas Generated Driving Force";

U.S. patent application Ser. No. 10/172,628, file Jun. 14, 2002, entitled "Blade Tip For Puncturing Cupro-Nickel Seal Cup"; and U.S. patent application Ser. No. 10/172,281, filed Jun. 14, 2002, entitled "Vacuum Arc Eliminator Having A Bullet Assembly Actuated By A Gas Generating Device".

BACKGROUND OF THE INVENTION

1. Field of the Invention

This invention relates to a vacuum arc interrupter and, more specifically, to a vacuum arc interrupter having a bullet assembly with a lance that has a flared body structured to engage a tapered opening in a conductor.

2. Background Information

There is the potential for an arcing fault to occur across the power bus of a motor control center (MCC), another low voltage (LV) enclosure (e.g., an LV circuit breaker panel), other industrial enclosures containing LV power distribution components, as well as medium voltage (MV) enclosures. This is especially true when maintenance is performed on or about live power circuits. Frequently, a worker inadvertently shorts out the power bus, thereby creating an arcing fault inside the enclosure. The resulting arc blast creates an extreme hazard and could cause injury or even death. This problem is exacerbated by the fact that the enclosure doors are typically open for maintenance.

It is known to employ a spring device and piston to rapidly couple a live conductor to a grounded conductor in a vacuum arc interrupter in order to short the circuit upstream of the LV components. A vacuum arc interrupter utilizes two contacts in a vacuum chamber. One contact is fixed and the other contact is movable. The movable contact includes a stem, which is coupled to a bellows, that extends outside of the vacuum chamber. The spring is coupled to the stem and to a release device. The release device is coupled to an arc sensor in the LV or MV enclosure. The stem, and therefore the movable contact, moves from a first position at one end of the chamber to a second position at the opposite end of the chamber. One contact is coupled to the LV or MV circuit and the other contact is grounded. In operation the first position of the piston corresponds to the open position of the contacts. When an arc occurs in the LV or MV equipment, the arc sensor actuates the spring release device, thereby allowing the contacts to move into the second position and short the circuit.

Another device, that is, a device which is not a vacuum arc interrupter, for shorting a circuit included a tapered slug which is propelled by high pressure gas into a tapered set of openings extending through two bus bars and a layer of insulation. The slug is maintained in a pressure chamber coupled to a gas-generating device. When gas is rapidly introduced to the pressure chamber, the slug is propelled into the tapered opening, contacting both bus bars. Typically, one bus is coupled to a live circuit and the other bus is grounded. Thus, when the slug contacts both buses, the circuit is shorted.

These interrupters suffer from several disadvantages. For example, the prior art vacuum arc interrupters require multiple components to be maintained in the vacuum chamber. Certain components, such as the bellows, are difficult and expensive to construct. Construction of the vacuum arc interrupter could be simplified if more components could be maintained outside of the vacuum chamber. Prior art vacuum arc interrupters utilizing springs, because of their nature, do not have a means for stopping the upward motion of the movable contact. That is, the spring mechanism is structured to absorb the reactive forces caused by the contacts colliding. Certain prior art vacuum arc eliminators also include a combination of springs and shock absorbers. The use of a spring or a combination of a spring and a shock absorber reduces, but does not eliminate, the bounce which occurs when the moving component contacts the stationary component. Thus, the prior art vacuum arc interrupters do not have a mechanism for stopping the advance of the moving component.

Furthermore, with regard to the prior art utilizing a slug, the slug relied on the application of gas pressure on the piston to ensure that the piston remained in the second position. Or, if the slug moved in a downward direction and the slug was heavy, gravity provided a sufficient force to hold the slug in place. That is, this system did not include a mechanical lock to maintain the slug in the second position. Additionally, the prior art slugs have a generally flat pressure surface. Because the gas is typically introduced through a small opening, the pressure distribution on the slug pressure surface is uneven. The uneven pressure distribution prevents the slug from moving as fast as a slug where the pressure distribution is even. Another disadvantage of this device is that, where the slug is received in a conductor having a small cross-sectional area, the magnetic field created at the conductor may by very strong and cause the slug to be repelled.

There is, therefore, a need for a vacuum arc interrupter having a structure that is designed to halt the advance of a moving component, such as a bullet assembly.

There is a further need for a vacuum arc interrupter bullet assembly that is structured to be mechanically locked in a closed position.

There is a further need for a vacuum arc interrupter with a shaped electrode structured to reduce the strength of the magnetic field at the point of contact between a bullet assembly and conductor.

SUMMARY OF THE INVENTION

These needs, and others, are met by the disclosed invention which provides a bullet assembly for a vacuum arc interrupter having a tapered and flared lance coupled to a piston assembly having a pressure surface that is not flat. The vacuum arc interrupter includes a first conductor that is disposed within, or forms part of, a vacuum chamber. The second conductor is disposed outside of the vacuum chamber. The vacuum arc interrupter bullet assembly is disposed in a pressure assembly that includes pressure chamber and a gas generating source. The gas generating source is structured to rapidly fill the pressure chamber with a gas, thereby increasing the pressure within the chamber. The pressure chamber has a barrel with two open ends, a narrow, first sized portion, a tapered transition portion and a wide, second sized portion. The gas generating source is coupled to the first sized portion. The bullet assembly is slidably disposed within the second sized portion, with the lance extending away from the first sized portion.

The bullet assembly lance is made from a conductive material and includes an elongated body having a tapered tip and a flared base. The tapered tip is structured to engage the first conductor. The flared base is structured to correspond to the shape of a tapered passage in the second conductor. The lance is sized so that as the flared base engages the tapered opening in one conductor, the tip firmly engages the cup disposed on the other conductor. Thus, the lance acts to electrically couple the two conductors. Moreover, the flared base absorbs the impact of the rapidly moving bullet assembly as it contacts the second conductor. As such, both the cup on the first conductor and the attachment between the lance and the piston assembly do not have to absorb the entire impact force and may be structured to handle less stress. Additionally, after the flared base contacts the second conductor, and the downstream arc is interrupted, electricity will flow through the flared base and second conductor thereby heating the flared base and second conductor. The heat produced is sufficient to cause the flared base and second conductor to partially melt and become welded together. As such, the lance and the conductor will be coupled by a mechanical lock, that is, the weld.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
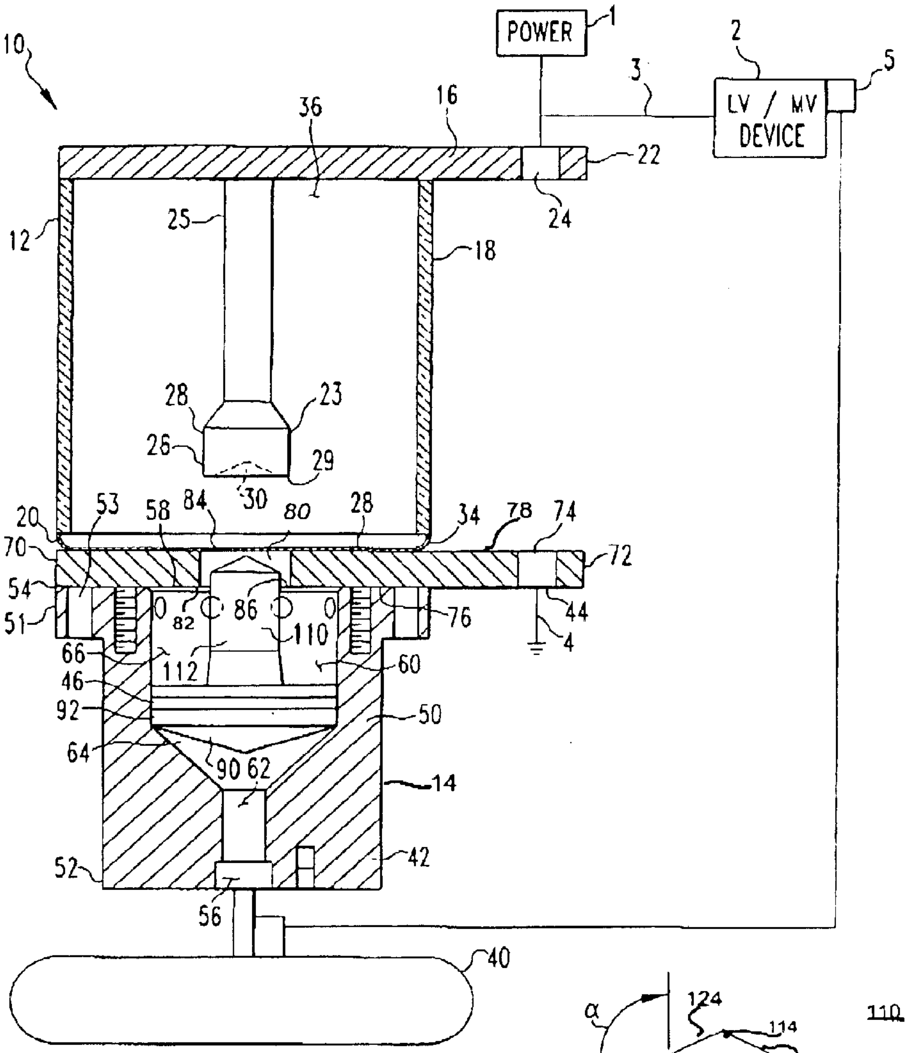
FIG. 1 is a cross-sectional view of the present invention with the piston in the first position.
Figure 1A:
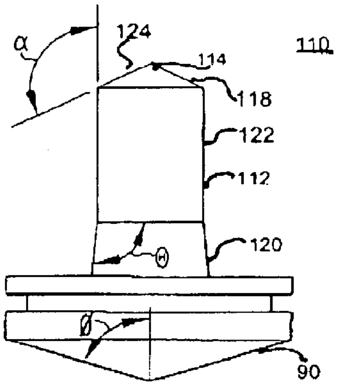
Figure 2:
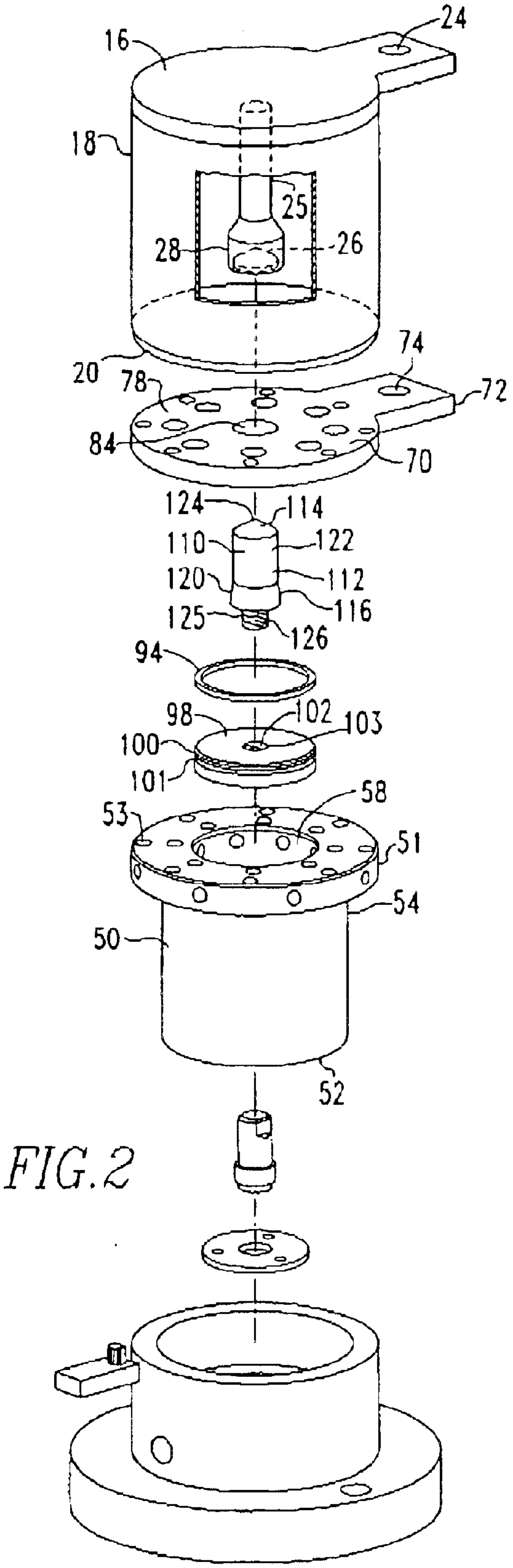
FIG. 2 is an exploded isometric view of the present invention.
Figure 3:
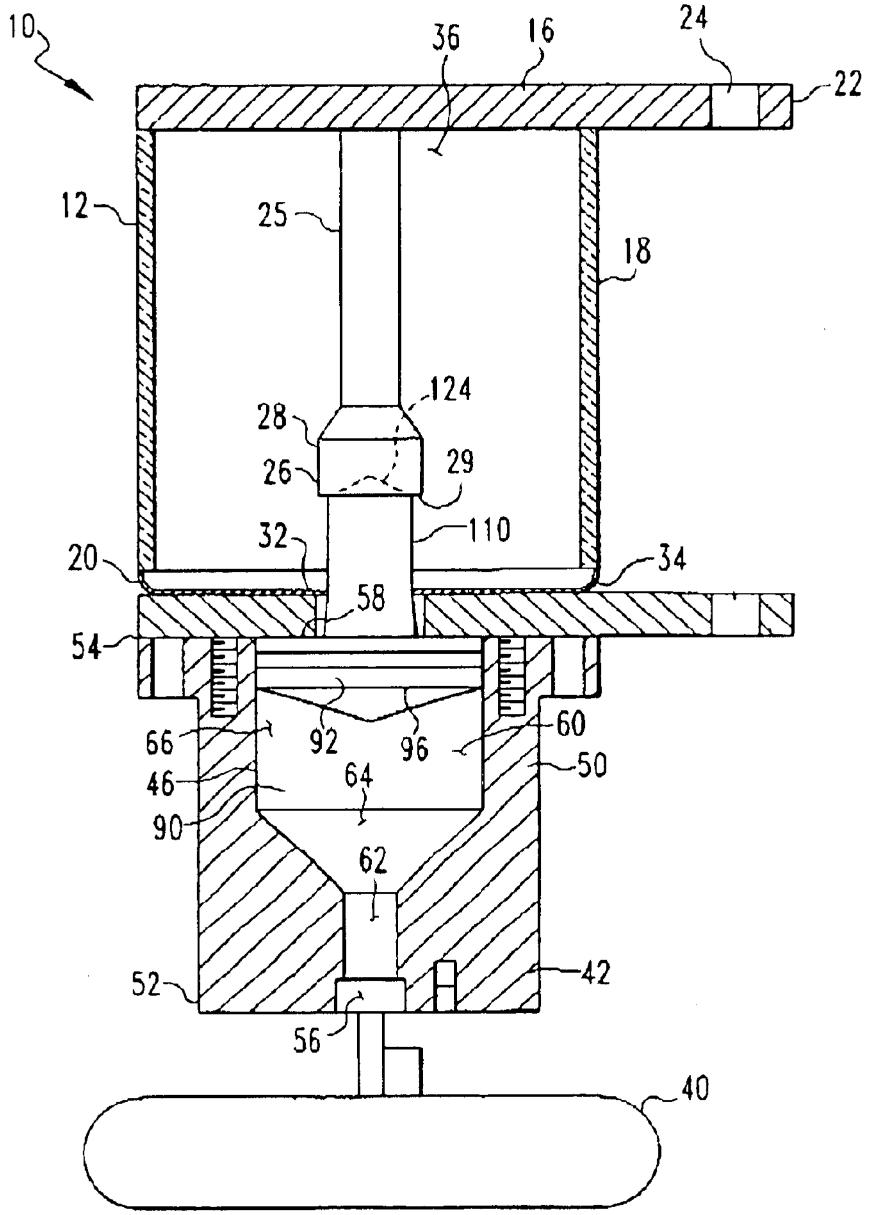
FIG. 3 is a cross-sectional view of the present invention with the piston in the second position.

As shown in FIGS. 1–3, a vacuum arc interrupter 10 includes a vacuum chamber assembly 12 and a pressure chamber assembly 14. The vacuum chamber assembly 12 includes a first conductor 16, a non-conductive housing 18, and a seal cup 20. The first conductor 16 is made from a conductive material and, preferably, is shaped as a circular disk. The first conductor 16 may include a radial extension 22 having an attachment opening 24 therethrough. The attachment opening 24 is structured to allow a power line to be coupled to the first conductor 16. The first conductor 16 also includes an electrode 23 having a stem 25 and a receiving cup 26. The cup 26 is disposed at the distal end of the stem 25 and extends into the vacuum chamber 36 described hereinafter. The cup 26 is made from a conductive material and includes a continuous sidewall 28 having an open end 29, thereby defining a cavity 30. The cup 26 is supported by the stem 25 so that the cup 26 is spaced from the first conductor 16. The open end 29 has a cross-sectional area that is smaller than the widest portion of the lance tip 118, described hereinafter. To reduce the magnitude of the electric field on the cup 26, the cup 26 may have a cross-sectional area greater than is mechanically required. The stem 25 may have the same cross-sectional area, or be smaller than, the cup 26.

The non-conductive housing 18 is made from a non-conductive material, preferably a ceramic. The non-conductive housing 18 has a shape that corresponds to the shape of the first conductor 16. Thus, when the first conductor 16 has a disk shape, the non-conductive housing 18 is a hollow cylinder. One axial end of the non-conductive housing 18 is sealingly coupled to the first conductor 16.

The seal cup 20 includes a generally planar base member 32 and a sidewall 34 generally perpendicular thereto. The seal cup 20 is made from a rigid, non-brittle material such as a cupro-nickel alloy. The alloy material preferably has between about 50 to 95% copper, and more preferably about 70% copper, and between about 5 to 50% nickel, and more preferably about 30% nickel. The alloy may also have lesser amounts of other elements or impurities. Generally, the seal cup 20 material may be torn without a substantial amount of fragmentation. The seal cup sidewall 34 is sealingly coupled to the axial end of the non-conductive housing 18 opposite the first conductor 16. Thus, the combination of the first conductor 16, the non-conductive housing 18, and the seal cup 20 define a vacuum chamber 36. As will described hereinafter, the seal cup 20 contacts the second conductor 70. To prevent an arc from forming within the vacuum chamber 36, the first conductor 16, or the electrode 23 if present, and the seal cup 20 are separated by a distance sufficient to lower the magnitude of the electric field to below that which would lead to an electrical breakdown within the vacuum. This distance is, generally, about 0.4 inch to 2.0 inches and varies depending upon the voltage in the system. For example, for a voltage of about 125 kilovolts, the distance is preferably about 0.6 inch.

The pressure chamber assembly 14 includes a gas generation device 40, a pressure chamber body 42, a second conductor 70, and a bullet assembly 46. The gas generation device 40 may be any gas generation device such as those manufactured by TRW Airbag Systems GmbH & Co. KG, Wernher-Von-Braun-STR. 1, D-84544 Asehan am Inn, Germany.

The pressure chamber body 42 is preferably cylindrical and includes a barrel 50 and a mounting flange 51. The barrel 50 has a first end 52 and a second end 54. The barrel 50 has an inlet port opening 56 on the first end 52 and a bullet assembly opening 58 at the second end 54. The inlet port opening 56 is smaller than the bullet assembly opening 58. The inlet port opening 56 is in fluid communication with the bullet assembly opening 58. Thus, the barrel 50 defines a pressure chamber 60. The pressure chamber 60 includes a first sized portion 62, a transition portion 64, and a second sized portion 66. The first sized portion 62 has a smaller cross-sectional area than the second sized portion 66. The first sized portion 62 is in fluid communication with the inlet port opening 56. The second sized portion 66 is in fluid communication with the bullet assembly opening 58. The transition portion 64 is disposed between, and in fluid communication with, the first sized portion 62 and the second sized portion 66. The transition portion 64 has a cross-sectional area that tapers from the cross-sectional area of the first sized portion 62 to the cross-sectional area of the second sized portion 66. The pressure chamber 60 preferably has a generally circular cross-sectional area. The flange 51 extends radially from the barrel second end 54 and includes a plurality of fastener openings 53.

The second conductor 70 is made from a conductive material and, preferably, is shaped as a circular disk. The second conductor 70 may include a radial extension 72 having an attachment opening 74 therethrough. The attachment opening 74 is structured to allow a ground line to be coupled to the second conductor 70. The second conductor 70 has a first side 76 and a second side 78. The second conductor 70 also includes a tapered passage 80, preferably medially disposed on the disk. The tapered passage 80 has a first sized opening 82 on the second conductor first side 76 and a second sized opening 84 on the second conductor second side 78. The first sized opening 82 is larger than the second sized opening 84. Thus, the tapered passage 80 has a tapered sidewall 86 extending between the openings 82, 84. The tapered passage 80 is tapered at an angle corresponding to the angle of the flare of the lance base portion 120, described below. As described hereinafter, typically a power line is coupled to the first conductor 16 and a ground line is connected to the second conductor 70.

The bullet assembly 46 includes a piston assembly 90 and a lance 110. The piston assembly 90 includes a piston body 92, and may include a piston ring 94. The piston body 92 is a solid body which is generally planar having a first side 96, a second side 98, and a sidewall 100. The piston body 92 has the same general cross-sectional shape and size as the pressure chamber second portion 66 and is structured to be slidably disposed therein. The sidewall 100 includes a groove 101 wherein the piston ring 94 may be seated. The piston first side 96 is not flat having either a concave surface, see FIG. 4D, or, preferably, a convex surface, See FIGS. 1–3. Where the piston body 92 is a disk, i.e., when the pressure chamber 60 is circular, the first side 96 is conical having an angle, Ø, between about 30 to 90 degrees, and preferably about 80 degrees as measured from a line passing through the axis of the piston body 92. The first side 96, preferably, has a more obtuse angle than the angle of the taper of the pressure chamber transition portion 64. As is described hereinafter, the piston body first side 96 is exposed to the pressure created by the gas-generating device 40 and may be referred to as the "pressure surface." The piston body second side 98 is generally flat and includes an attachment device 102, for example, a threaded opening 103.

Figure 4A:
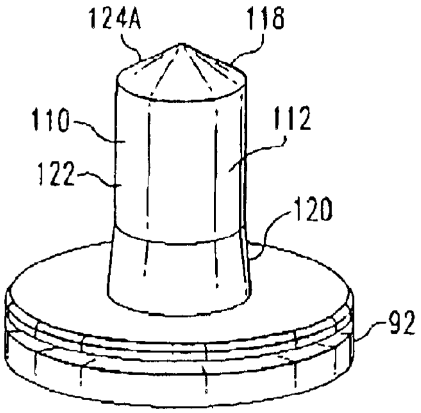
FIG. 4A is an isometric view of the bullet assembly wherein the lance has a circular medial portion and a conical tip.
Figure 4B:
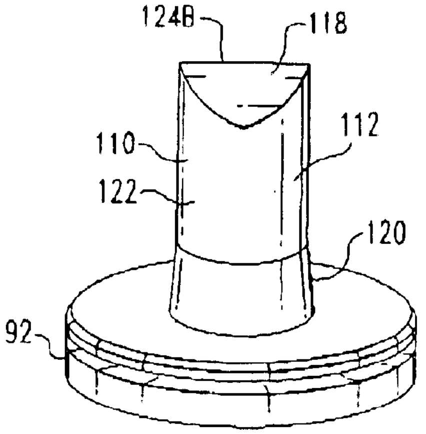
FIG. 4B is an isometric view of the bullet assembly wherein the lance has a circular medial portion and a knife edge tip.
Figure 4C:
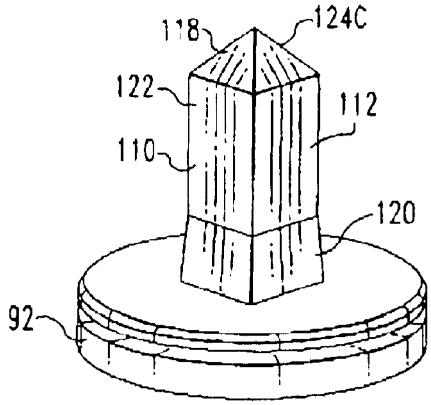
FIG. 4C is an isometric view of the bullet assembly wherein the lance has a square medial portion and a pyramidal tip.
Figure 4E:
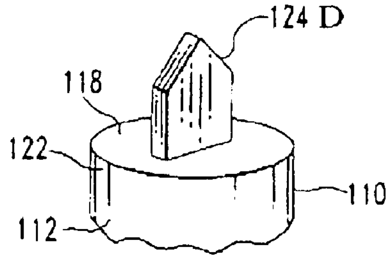
FIG. 4E is an isometric view of the bullet assembly wherein the lance has a circular medial portion and a blade tip.
Figure 4D:
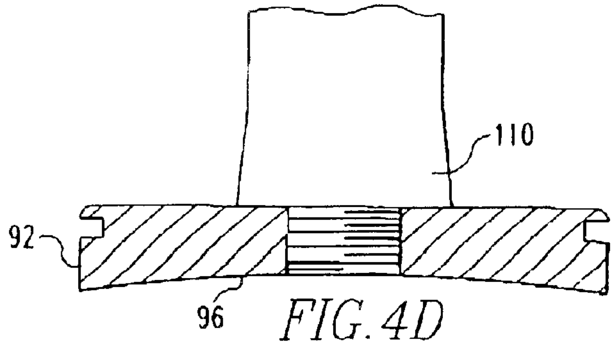
FIG. 4D is a cross-sectional view of a piston body having a concave first side.

The lance 110 includes an elongated body 112 having a first end 114 and a second end 116. The lance body 112 includes a tip 118 disposed at the first end 114 and a base 120 disposed at the second end 116. Between the tip 118 and the base 120 is a medial portion 122. The tip 118 tapers to an edge or a point. The end of the tip 118 acts as a blade portion 124 to assist in cutting the seal cup 20 as described below. The angle of the tip taper, $\alpha$, is between about 90 and 150 degrees and preferably about 120 degrees as measured from a line parallel to the outer surface of the surface of the medial portion 122. The medial portion 122 preferably has a constant cross-sectional area. The medial portion 122 preferably has a circular or square cross-section. As shown in FIG. 4A, when the medial portion 122 is circular, the tip 118 and the blade portion 124A are, preferably, conical. However, as shown in FIG. 4B, the medial portion 122 may be circular and the tip 118 and blade portion 124 may be a knife edge 124B. As shown in FIG. 4C, when the medial portion 122 is square, the tip 118 and blade portion 124C are pyramidal. Alternatively, as shown in FIG. 4E, the medial portion 122 may be circular and have a tapered blade 124D. The base portion 120 is flared relative to the medial portion 122. The base portion 120 flare is at an angle, $\theta$, between about 90 and 150 degrees, or, preferably about 94 degrees as measured from a plane passing radially through the lance medial portion 122. The lance second end 116 includes an attachment device 125, for example, a threaded rod 126 structured to engage the piston attachment device 102.

The bullet assembly 46 is formed when the lance 110 is coupled to the piston assembly 90 by coupling the lance attachment device 125 to the piston attachment device 102. Thus, the lance 110 extends from the piston second side 98. The lance 110 has a length sufficient to span the gap between the second conductor 70 and the cup 26. The lance 110 is, however, sized so that the flared base 120 contacts the second contact tapered opening as the tip 118 contacts the cup 26.

The pressure chamber assembly 14 is formed by inserting the bullet assembly 46 into the chamber second size portion 66 with the lance 110 extending toward the bullet assembly opening 58. The bullet assembly 46 is disposed in a first position where the piston body 92 is in the pressure chamber second sized portion 66 and adjacent to the chamber transition portion 64, with the lance 110 extending into the second sized portion 66. The lance 110 does not, however, extend beyond the bullet assembly opening 58. Because the piston body first side 96 has a taper angle that is more obtuse that the taper angle of the pressure chamber transition portion 64, a gap exists between the piston body first side 96 and the pressure chamber transition portion 64. The piston ring 94 engages the sidewall of the chamber second sized portion 66. The second conductor 70 is coupled to the pressure chamber mounting flange 51 by fastener 53 with the second conductor first side 76 disposed toward the pressure chamber 60. Thus, the larger, first sized opening 82 of the tapered passage 80 is adjacent to the bullet assembly 46. The gas generation device is coupled to, and in fluid communication with, the inlet port opening 56.

In this configuration, the bullet assembly 46 is structured to move from the first position, described hereinbefore, to a second position, shown in FIG. 3, where the piston body 92 is moved adjacent to the second conductor 70. In the second position, the flared base 120 of the lance 110 engages the second conductor tapered passage 80, and the lance 110 extends beyond the second conductor 70.

Accordingly, to assemble the vacuum arc interrupter 10, the vacuum assembly 12 is coupled to the pressure chamber assembly 14 with the seal cup 20 contacting, and in electric communication with, the second conductor 70. In this configuration, translation of the bullet assembly 46 from the first position to the second position will result in the lance blade portion 124 piercing the seal cup 20 and the lance 110 contacting the first conductor cup 26. As stated hereinbefore, the lance 110 is sized such that the tip 118 engages the cup 26 at the same time the flared base 120 engages the second contact tapered passage 80. Thus, when the bullet assembly 46 is in the second position, the first and second conductors 16, 70 are in electrical communication.

In operation, the bullet assembly 46 is moved from the first position to the second position by the gas-generating device 40. That is, the gas generating device 40 delivers gas at a pressure between about 180 and 375 psi, and preferably about 180 psi, through the inlet port opening 56 in to the chamber first size portion 62. This increase of pressure occurs in about 0.50 msec and causes the bullet assembly 46 to move from the first position to the second position in less than 2.0 msec. Because the inlet port opening 56 is on the piston first side 96, gas from the gas generating device will flow into the chamber first sized portion 62 and transition portion 64 and contact the angled piston first side 96. The angle Ø of the piston first side 96 assists the gas in dispersing through the chamber transition portion 64 and thus creates a more even pressure distribution on the piston first side 96. As the bullet assembly 46 moves from the first position to the second position, the lance tip 118 and medial portion 122 pass through the tapered passage 80 causing the blade portion 124 to puncture the seal cup planar member 32. Because the seal cup 20 is made of a cupro-nickel material, the seal cup 20 is torn as opposed to fragmenting.

As stated hereinbefore, the lance tip 118 engages the cup 26. If the lance tip 118 is conical, the taper of the tip 118 and the taper of the cup 26 sidewall is, preferably, similar. Thus, the lance 110 and the cup 26 cooperatively engage each other. If, however, the lance tip 118 is pyramidal, the lance 110 and cup 26 will engage in a mechanical connection as the square lance 110 collides with the circular cup 26. This collision will form a mechanical connection that may be enhanced if an arc forms between the lance 110 and the cup 26 thereby partially melting either the lance 110 or the cup 26. Additionally, after the downstream arc is interrupted and electricity is flowing through the vacuum arc interrupter 10, heat generated in the flared base 120 and the second contact tapered passage 80 will partially melt the metal components and form a weld. As such, the bullet assembly 46 is mechanically locked by a weld to the second conductor 70.

As shown in FIG. 1, to prevent arcing in a LV or MV device 1, the vacuum arc interrupter 10 must be electrically coupled to the circuit, between the power source 2 and the LV or MV device 1 by a power line 3. Typically, the power line 3 connected to the circuit is coupled to the first conductor 16 and a ground line 4 is connected to the second conductor 70. An arc detection device 5, which may be any common arc detector or a device such as the one described in U.S. Pat. No. 6,633,009, incorporated by reference, is used to detect an arc within the LV or MV device 1 and to activate the gas generation device 40. Thus, when an arc in the LV or MV device 1 is detected, the vacuum arc interrupter 10 is activated thereby grounding the circuit upstream of the LV or MV 1 device and interrupting the arc. The circuit with the bolted fault created by the vacuum arc interrupter 10 is broken by a circuit breaker (not shown) upstream of the vacuum arc interrupter 10.

Figure 5:
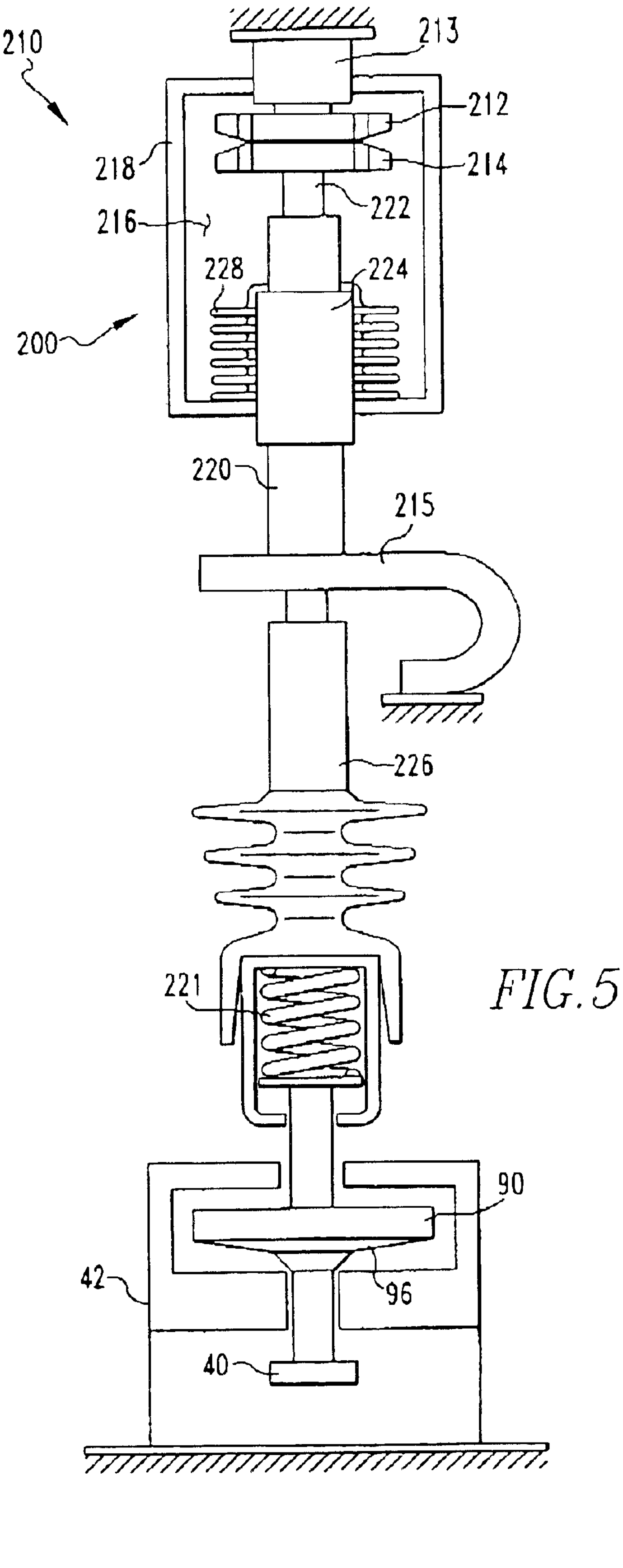
FIG. 5 is a schematic view of a vacuum arc interrupter utilizing the piston of the present invention.

Aspects of this invention may also be used in conjunction with an alternate embodiment of the vacuum arc interrupter 210 having two contacts in a vacuum chamber assembly 200. That is, as shown in FIG. 5, a second embodiment of the vacuum arc interrupter 210 includes the vacuum chamber assembly 200 having two contacts 212, 214 disposed in a vacuum chamber 216, as well as a first bus 213 and a second bus 215. The vacuum chamber 216 includes a non-conductive housing 218. A first contact 212 is fixed, and the other, second contact 214 is movable. The fixed contact 212 is sealingly coupled to the non-conductive housing 218 and is in electrical communication with a first bus 213 that is external to the vacuum chamber 216. The movable contact 214 is coupled to a rod 220 having a first end 222, a medial portion 224 and a second end 226. The movable contact 214 is disposed at the rod first end 222. A bellows 228 is coupled to the rod medial portion 224 and to the non-conductive housing 218. The rod 220 is structured to move between a first position wherein the contacts are spaced from each other, to a second position wherein the contacts contact each other. A second bus 215 is coupled to the rod 220 and is in electrical communication with the second contact 214. The vacuum arc interrupter 210 further includes a pressure chamber assembly 14. The pressure chamber assembly 14 is substantially similar to the pressure chamber assembly 14 described hereinabove. The second end of the rod 220 is coupled to a piston assembly 90 disposed in a pressure chamber assembly 14. The piston assembly 90 is substantially similar to the piston assembly 90 described hereinabove. That is, a piston assembly 90 has a concave or convex first, pressure surface 96, that is exposed to the gas created by a gas generation device 40. In this embodiment of the vacuum arc interrupter 210, however, the piston assembly 90 is coupled to the rod 220. As such, when the gas generation device 40 is activated, the piston assembly 90 moves the rod 220 between the first position and the second position, thereby moving the contacts 212, 214 from the open position to the closed position. The closing of the contacts 212, 214 occurs in less than 2.0 msec. Typically the first bus 213 is coupled to, and in electrical communication with, the circuit having the MV or LV device and the second bus 215 is in electrical communication with a ground. Additionally, the rod 220 may include one or more impact absorbing devices 221, such as springs or shock absorbers, disposed between the piston assembly 90 and the second movable contact 214.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A vacuum arc interrupter comprising:

a vacuum chamber assembly having a first conductor coupled to a power line;

a pressure chamber assembly having a second metal conductor coupled to a ground and a bullet assembly having a metal lance;

said pressure chamber assembly disposed adjacent to said vacuum chamber assembly;

said second conductor having a passage;

said bullet assembly structured to move from a first position, wherein said lance is spaced from said passage, to a second position, wherein said lance engages said passage and said first conductor; and whereby electricity flows through said lance and said second conductor thereby creating heat sufficient to cause said lance and said second conductor to partially melt and weld together.

2. The vacuum arc interrupter of claim 1 wherein said second conductor passage is a tapered passage; and said bullet assembly lance has a flared base.

3. The vacuum arc interrupter of claim 2 wherein:

said lance body includes a tip, a medial portion, and a base;

said tip disposed at said lance first end, said base disposed at said lance second end, and said medial portion disposed therebetween;

said base is flared, having a smaller cross-sectional area adjacent to said medial portion and a greater cross-sectional area adjacent to said piston body; and said base flare angle being between about 90 and 150 degrees.

4. The vacuum arc interrupter of claim 3, wherein said base flare angle is about 94 degrees.

5. The vacuum arc interrupter of claim 4, wherein said lance medial portion has a generally constant cross-sectional area.

6. The vacuum arc interrupter bullet of claim 2, wherein said tapered passage has a generally circular cross-sectional area and a taper angle between about 90 and 150 degrees.

7. The vacuum arc interrupter of claim 6, wherein said tapered passage has a taper angle of about 94 degrees.

8. The vacuum arc interrupter of claim 1, wherein said lance is shaped to create an arc between said lance and said first conductor, whereby said lance and said first conductor are welded together.

9. A vacuum arc interrupter comprising:

a vacuum chamber assembly having a first conductor disposed in a vacuum;

a pressure chamber assembly having a second conductor, a pressure chamber, and a bullet assembly;

said pressure chamber assembly disposed adjacent to said vacuum chamber assembly;

said second conductor having a tapered passage;

said bullet assembly disposed within said pressure chamber and structured to move from a first position to a second position;

said bullet assembly including a piston body having a first side and a second side, and a lance made from a conductive material having an elongated body with a first end and a second end;

said lance second end coupled to said piston body second side;

said lance second end being flared;

said bullet assembly structured to move from a first position, wherein said lance is spaced from said passage, to a second position, wherein said lance engages said passage and said first conductor; and whereby electricity flows through said lance and said second conductor thereby creating heat sufficient to cause said lance and said second conductor to partially melt and weld together.

10. The vacuum arc interrupter of claim 9 wherein:

said lance body includes a tip, a medial portion, and a base;

said tip disposed at said lance first end, said base disposed at said lance second end, and said medial portion disposed therebetween;

said base is flared, having a smaller cross-sectional area adjacent to said medial portion and a greater cross-sectional area adjacent to said piston body; and said base flare angle being between about 90 and 150 degrees.

11. The vacuum arc interrupter of claim 10, wherein said base flare angle is about 94 degrees.

12. The vacuum arc interrupter of claim 11, wherein said lance medial portion has a generally constant cross-sectional area.

13. The vacuum arc interrupter bullet assembly of claim 11, wherein said tapered passage has a generally circular cross-sectional area and a taper angle between about 90 and 150 degrees.

14. The vacuum arc interrupter of claim 13, wherein said tapered passage has a taper angle of about 94 degrees.

15. The vacuum arc interrupter of claim 9 wherein:

said first conductor includes an electrode having a stem and a receiving cup; and said cup structured to engage said lance.

16. The vacuum arc interrupter of claim 15, wherein said stem has a smaller cross-sectional area than said cup.

17. The vacuum arc interrupter of claim 10, wherein said lance is shaped to create an arc between said lance and said first conductor, whereby said lance and said first conductor are welded together.

* * * * *